United States Patent
Elson et al.

(10) Patent No.: US 8,843,502 B2
(45) Date of Patent: Sep. 23, 2014

(54) SORTING A DATASET OF INCREMENTALLY RECEIVED DATA

(75) Inventors: Jeremy Eric Elson, Seattle, WA (US); Edmund Bernard Nightingale, Redmond, WA (US); Owen Sebastian Hofmann, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 13/168,491

(22) Filed: Jun. 24, 2011

(65) Prior Publication Data
US 2012/0330979 A1 Dec. 27, 2012

(51) Int. Cl.
*G06F 17/30* (2006.01)

(52) U.S. Cl.
CPC .... *G06F 17/30988* (2013.01); *G06F 17/30348* (2013.01); *G06F 17/30516* (2013.01)
USPC .......................... 707/752; 707/802; 709/203

(58) Field of Classification Search
CPC .......... G06F 17/3089; G06F 17/30348; G06F 17/30595; G06F 17/30292; G06F 17/30551; G06F 17/30067; G06F 17/30289; G06F 17/30345; G06F 17/30557; G06F 17/30575; G06F 17/30604; G06F 17/30607
USPC ......... 707/752, 609, 661, 803, 662, 673, 694, 707/715, 740, 769, 792, 802, 825, 827, 707/948; 709/201, 203, 225, 229, 246
See application file for complete search history.

(56) References Cited

U.S. PATENT DOCUMENTS

| | | | |
|---|---|---|---|
| 4,491,945 A | 1/1985 | Turner | |
| 4,780,870 A | 10/1988 | McHarg et al. | |
| 5,142,687 A | 8/1992 | Lary | |
| 5,305,320 A | 4/1994 | Andrews et al. | |
| 5,408,649 A | 4/1995 | Beshears et al. | |
| 5,423,046 A | 6/1995 | Nunnelley et al. | |
| 5,553,285 A | 9/1996 | Krakauer et al. | |
| 5,621,884 A | 4/1997 | Beshears et al. | |

(Continued)

FOREIGN PATENT DOCUMENTS

WO 2010/108368 A1 9/2010
WO 2010108368 9/2010

OTHER PUBLICATIONS

Nyberg, et al., "AlphaSort: A Cache-Sensitive Parallel External Sort", Retrieved at <<http://staff.ustc.edu.cn/~jpq/paper/flash/1995-VLDB-AlphaSort-%20A%20Cache-Sensitive%20Parallel%20External%20Sort.pdf>>, The VLDB Journal—The International Journal on Very Large Data Bases, vol. 4 No. 4, Mar. 28, 1995, pp. 603-627.

(Continued)

*Primary Examiner* — Shahid Alam

(57) ABSTRACT

A method of sorting a dataset includes incrementally receiving data from the dataset, and incrementally storing the received data as individual input data subsets as the data is received, thereby sequentially generating a plurality of filled data subsets of unsorted data. The method includes individually sorting each filled data subset of unsorted data concurrently with receiving data for a next one of the individual input data subsets, thereby sequentially generating a plurality of sorted input data subsets, and performing a merge sort on the plurality of sorted input data subsets, thereby incrementally generating a sorted version of the dataset.

17 Claims, 3 Drawing Sheets

(56) References Cited

U.S. PATENT DOCUMENTS

| | | | |
|---|---|---|---|
| 5,663,951 A | 9/1997 | Danneels et al. | |
| 5,787,274 A * | 7/1998 | Agrawal et al. | 707/803 |
| 5,845,113 A | 12/1998 | Swami et al. | |
| 5,857,186 A | 1/1999 | Narita et al. | |
| 5,914,878 A | 6/1999 | Yamamoto et al. | |
| 5,938,732 A | 8/1999 | Lim et al. | |
| 5,990,810 A * | 11/1999 | Williams | 341/51 |
| 5,990,904 A * | 11/1999 | Griffin | 345/631 |
| 6,021,407 A | 2/2000 | Meck et al. | |
| 6,035,296 A | 3/2000 | Fushimi | |
| 6,424,979 B1 | 7/2002 | Livingston et al. | |
| 6,577,613 B1 | 6/2003 | Ramanathan | |
| 6,850,489 B1 | 2/2005 | Omi et al. | |
| 6,871,295 B2 | 3/2005 | Ulrich et al. | |
| 6,963,996 B2 | 11/2005 | Coughlin | |
| 7,076,555 B1 | 7/2006 | Orman et al. | |
| 7,113,993 B1 | 9/2006 | Cappiello et al. | |
| 7,115,919 B2 | 10/2006 | Kodama | |
| 7,139,933 B2 | 11/2006 | Hsu et al. | |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,342,876 B2 | 3/2008 | Bellur et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,454,420 B2 | 11/2008 | Ray et al. | |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 | 7/2010 | Bots et al. | |
| 7,769,843 B2 | 8/2010 | Neuse et al. | |
| 7,774,469 B2 | 8/2010 | Massa et al. | |
| 7,801,994 B2 | 9/2010 | Kudo | |
| 7,805,580 B2 | 9/2010 | Hirzel et al. | |
| 8,010,829 B1 | 8/2011 | Chatterjee et al. | |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,234,518 B2 | 7/2012 | Hansen | |
| 8,261,033 B1 | 9/2012 | Slik et al. | |
| 2002/0152293 A1 | 10/2002 | Hahn et al. | |
| 2002/0194245 A1 | 12/2002 | Simpson et al. | |
| 2004/0153479 A1 | 8/2004 | Mikesell et al. | |
| 2005/0075911 A1 | 4/2005 | Craven, Jr. | |
| 2005/0078655 A1 | 4/2005 | Tiller et al. | |
| 2005/0094640 A1 | 5/2005 | Howe | |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0280168 A1 | 12/2006 | Ozaki | |
| 2007/0025381 A1 | 2/2007 | Feng et al. | |
| 2007/0156842 A1 | 7/2007 | Vermeulen et al. | |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2008/0114827 A1 | 5/2008 | Gerber et al. | |
| 2009/0006888 A1 | 1/2009 | Bernhard et al. | |
| 2009/0106269 A1 | 4/2009 | Zuckerman et al. | |
| 2009/0112921 A1 | 4/2009 | Oliveira et al. | |
| 2009/0113323 A1 | 4/2009 | Zhao et al. | |
| 2009/0183002 A1 | 7/2009 | Rohrer et al. | |
| 2009/0204405 A1 | 8/2009 | Kato et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1 | 10/2009 | Lacapra et al. | |
| 2009/0300407 A1 | 12/2009 | Kamath et al. | |
| 2009/0307329 A1 | 12/2009 | Olston et al. | |
| 2009/0307334 A1 | 12/2009 | Maltz et al. | |
| 2010/0008230 A1 | 1/2010 | Khandekar et al. | |
| 2010/0008347 A1 | 1/2010 | Qin et al. | |
| 2010/0094955 A1 | 4/2010 | Zuckerman et al. | |
| 2010/0094956 A1 | 4/2010 | Zuckerman et al. | |
| 2010/0161657 A1 | 6/2010 | Cha et al. | |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0250746 A1 | 9/2010 | Murase | |
| 2010/0306408 A1 | 12/2010 | Greenberg et al. | |
| 2010/0332818 A1 | 12/2010 | Prahlad et al. | |
| 2011/0022574 A1 | 1/2011 | Hansen | |
| 2011/0153835 A1 | 6/2011 | Rimae et al. | |
| 2011/0246471 A1 | 10/2011 | Rakib | |
| 2011/0246735 A1 | 10/2011 | Bryant et al. | |
| 2011/0258290 A1 | 10/2011 | Nightingale et al. | |
| 2011/0258297 A1 | 10/2011 | Nightingale et al. | |
| 2011/0258482 A1 | 10/2011 | Nightingale et al. | |
| 2011/0258488 A1 | 10/2011 | Nightingale et al. | |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0054556 A1 | 3/2012 | Grube et al. | |
| 2012/0197958 A1 | 8/2012 | Nightingale et al. | |

OTHER PUBLICATIONS

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

Bafna et al, "Chirayu: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.

Buddhikot et al, "Design of a Large Scale Multimedia Storage Server," Journal Computer Networks and ISDN Systems, vol. 27, Issue 3, Dec. 1994, pp. 1-18.

Chen et al, "Replication-Based Highly Available Metadata Management for Cluster File Systems," 2010 IEEE International Conference on Cluster Computing, Sep. 2010, pp. 292-301.

Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Sinnamohideen et al, "A Transparently-Scalable Metadata Service for the Ursa Minor Storage System," USENIX ATC' 10 Proceedings of the 2010 USENIX Conference, Jun. 2010, 14 pgs.

Weil et al, "CRUSH: Controlled, Scalable, Decentralized Placement of Replicated Data," Proceedings of SC '06, Nov. 2006, 12 pgs.

(56) References Cited

OTHER PUBLICATIONS

Weiser, "Some Computer Science Issues in Ubiquitous Computing," retrieved at <<https://www.cs.ucsb.edu/~ravenben/papers/coreos/Wei93.pdf>>, Mar. 1993, 14 pgs.

Non-Final Office Action for U.S. Appl. No. 12/763,133, mailed on Sep. 16, 2011, Edmund Nightingale, "Memory Management and Recovery for Datacenters", 19 pages.

"Citrix Storage Delivery Services Adapter for NetApp Data ONTAP", retrieved on Mar. 9, 2010 at <<http://citrix.com/site/resources/dynamic/partnerDocs/datasheet_adapter.pd>>, Citrix Systems, Citrix Storage Delivery Services Data sheet, 2008, 2 pgs.

Office Action for U.S. Appl. No. 12/766,726, mailed on May 29, 2012, Nightingale et al., "Bandwidth-Proportioned Datacenters", 21 pages.

Office Action for U.S. Appl. No. 13/412,944, mailed on Oct. 11, 2012, Nightingale et al., "Reading and Writing During Cluster Growth Phase", 10 pages.

Office Action for U.S. Appl. No. 13/112,978, mailed on Dec. 14, 2012, Elson et al., "Data Layout for Recovery and Durability", 14 pages.

Office Action for U.S. Appl. No. 13/017,193, mailed on Dec. 3, 2012, Nightingale et al., "Parallel Serialization of Request Processing", 19 pages.

Office Action for U.S. Appl. No. 13/116,270, mailed Feb. 15, 2013, Nightingale et al., "Server Failure Recovery", 16 pages.

Office Action for U.S. Appl. No. 13/017,193, mailed on Jun. 3, 2013, Nightingale et al., "Parallel Serialization of Request Processing", 21 pages.

Office Action for U.S. Appl. No. 13/112,978, mailed on Jul. 17, 2013, Elson et al., "Data Layout for Recovery and Durability", 16 pages.

Office Action for U.S. Appl. No. 13/412,944, mailed on Oct. 11, 2012, Nightingale et al., Reading and Writing During Cluster Growth Phase, 10 pages.

Office Action for U.S. Appl. No. 12/763,107, mailed on Jul. 20, 2012, Nightingale et al., "Locator Table and Client Library for Datacenters", 11 pages.

Isard et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Kennedy, "Is Parallel Computing Dead", retrieved on Dec. 5, 2013, at http//www.crpc.rice.edu.newsletters/oct94/director.htm., Parallel Computing Newsletter, 2(4): Oct. 1994 2 pages.

Rhea et al., "Maintenance-Free Global Data Storage", IEEE Internet Computing, Sep.-Oct. 2001, pp. 40-49.

PCT Search Report mailed Oct. 23, 2012 for PCT Application No. PCT/US2012/035700, 7 pages.

\* cited by examiner

SORTING A DATASET OF INCREMENTALLY RECEIVED DATA

BACKGROUND

Sorting a large dataset is a problem commonly found in many applications. The total time required to sort a large dataset can be split into two parts: first, the input/output (I/O) delay in reading all the unsorted data from stable storage (e.g., disk) and writing the sorted data back. Second, there are CPU requirements for comparing enough of the data elements sufficiently to sort them.

The I/O portion of the sorting process is typically much slower than computation, particularly if the amount of computation done per unit of data is small. The time to sort data tends to be dominated by the time it takes to read or write the data from or to either the network or the storage medium (e.g. disk). This has changed in some recent storage systems, where I/O is dramatically faster than in previous systems—often by an order of magnitude. When sorting is implemented on such systems, the time required for computation becomes more significant, and it becomes more significant to optimize this portion of the sorting process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment is directed to system that splits unsorted input data into smaller subsets as it arrives, and sorts each input subset while the subsequent input subset is being read (or received, in the case of a network file system). The system according to one embodiment performs a merge sort on the sorted subsets once the output stage begins, and performs a merge to produce an output subset while the previous output subset is being written (or transmitted, in the case of a network file system).

One embodiment is directed to a method of sorting a dataset, which includes incrementally receiving data from the dataset, and incrementally storing the received data as individual input data subsets as the data is received, thereby sequentially generating a plurality of filled data subsets of unsorted data. The method includes individually sorting each filled data subset of unsorted data concurrently with receiving data for a next one of the individual input data subsets, thereby sequentially generating a plurality of sorted input data subsets, and performing a merge sort on the plurality of sorted input data subsets, thereby incrementally generating a sorted version of the dataset.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

In a naïve implementation, a program might be split the sorting process into three stages: (1) read unsorted data; (2) sort; (3) write sorted data. One embodiment of the system disclosed herein overlaps almost 100% of the compute time (step 2) with the time for reading (step 1) and the time for writing (step 3), reducing the total time for the second step to almost zero. Thus, the system hides the majority of the compute time for sorting by overlapping it with the time for I/O.

One embodiment is directed to system that splits unsorted input data into smaller subsets as it arrives, and sorts each input subset while the subsequent input subset is being read (or received, in the case of a network file system). The system according to one embodiment performs a merge sort on the sorted subsets once the output stage begins, and performs a merge to produce an output subset while the previous output subset is being written (or transmitted, in the case of a network file system).

One potential method for sorting is to use an incremental sorting mechanism like heap sort. Each time a datum arrives, it can be added to the heap. In this way, in theory at least, all data can be incrementally sorted as it arrives, and as soon as the last piece of data arrives the heap is entirely sorted and ready for output. However, it has been found that, in practice, this method is slow, because it does not exploit the locality of reference required for good performance in the CPU's memory cache. Thus, one embodiment incrementally sorts data using a quick sort, which is more cache-friendly.

Figure 1:
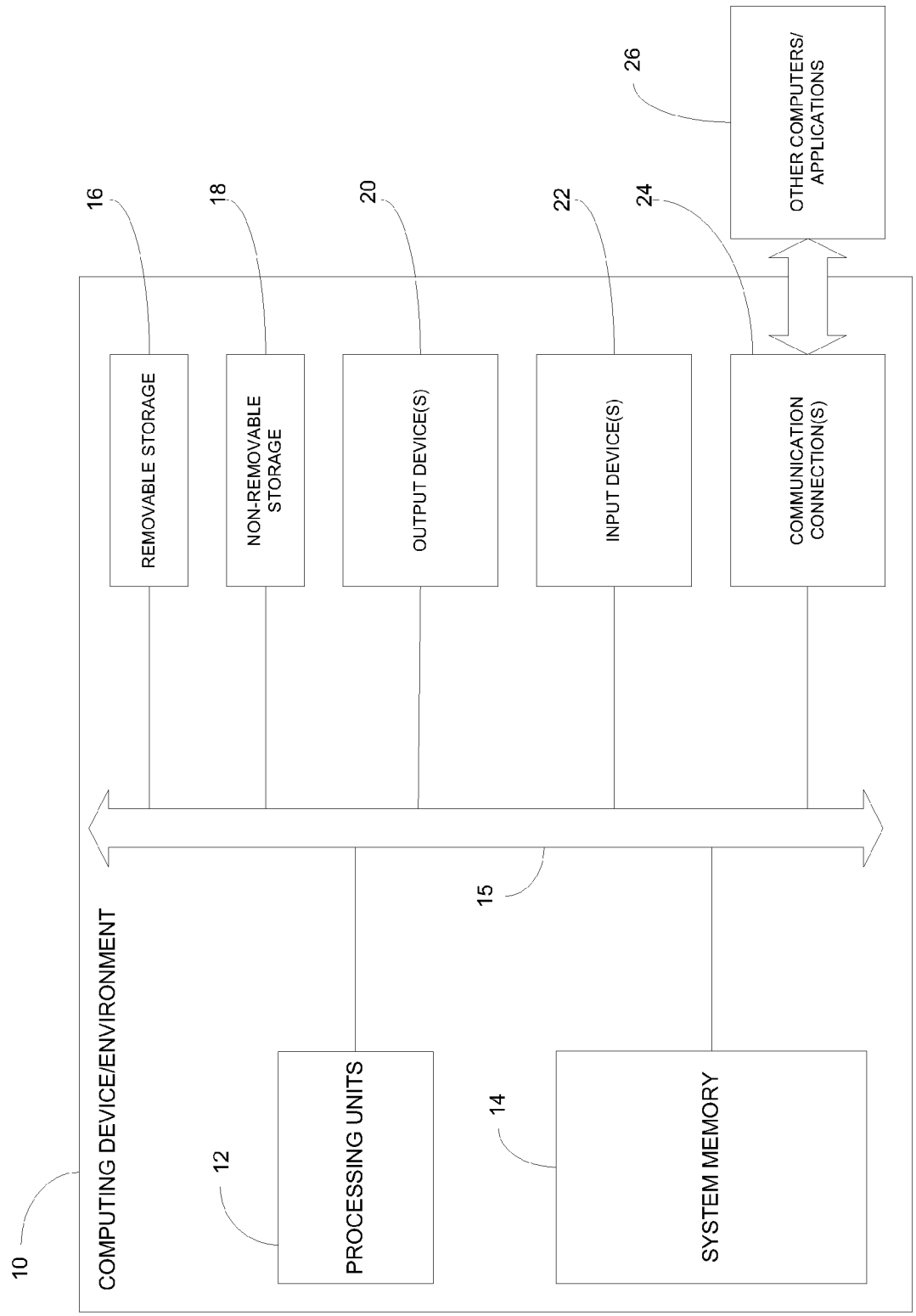
FIG. 1 is a block diagram illustrating a computing environment suitable for implementing aspects of a system for sorting a dataset according to one embodiment.

FIG. 1 is a diagram illustrating a computing environment 10 suitable for implementing aspects of a system for sorting a dataset according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 10. Any such computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
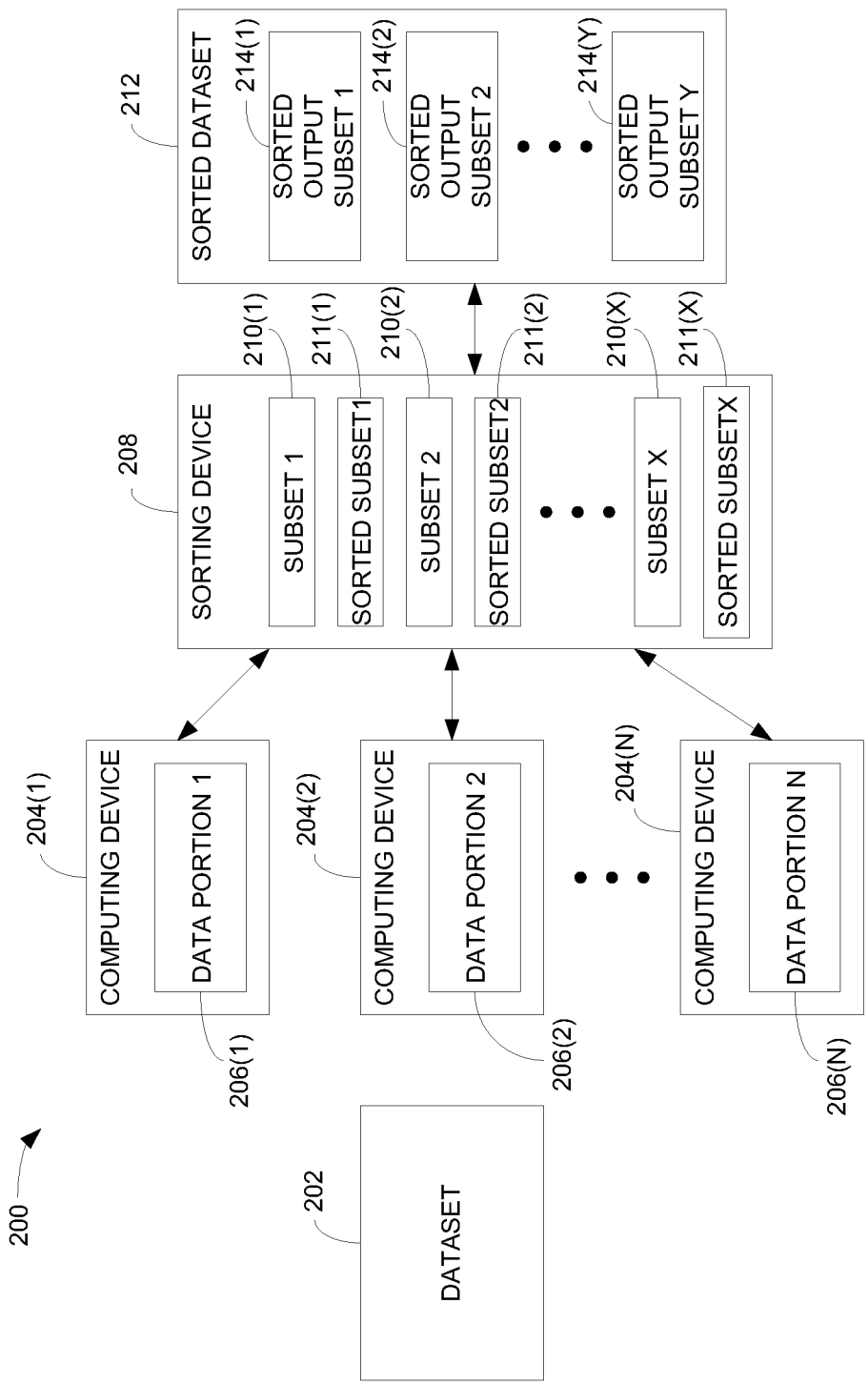
FIG. 2 is a block diagram illustrating a system for sorting a dataset according to one embodiment.

FIG. 2 is a block diagram illustrating a system 200 for sorting a dataset according to one embodiment. System 200 includes a plurality of computing devices 204(1)-204(N) (collectively referred to as computing devices 204), and a sorting device 208, where N is an integer greater than one. In one embodiment, computing devices 204 and sorting device 208 are each implemented as computers, such as that shown in FIG. 1. Sorting device 208 is configured to sort dataset 202. In the illustrated embodiment, dataset 202 is divided into a plurality of data portions 206(1)-206(N) (collectively referred to as data portions 206), which are stored on the plurality of computing devices 204(1)-204(N), respectively. In other embodiments, dataset 202 may be stored on a single computing device.

Sorting device 208 incrementally reads or receives unsorted data from data portions 206 stored on the computing devices 204. As unsorted data is being received, it is separated into independent input data subsets 210(1)-210(X) (collectively referred to as input data subsets 210) by sorting device 208, where X is an integer greater than one. As unsorted data arrives at sorting device 208, it is added to a current input data subset 210, and once the current input data subset 210 fills, it is closed, and future unsorted data that arrives goes into the next input data subset 210. Each input data subset 210 according to one embodiment has a finite capacity (e.g., $1/100^{th}$ or $1/1000^{th}$ of the total size of the dataset 202 to be sorted). As each subset 210 is filled, it is sorted by sorting device 208 (referred to as a "subset-sort"), thereby generating respective sorted input data subsets 211(1)-211(X) (collectively referred to as sorted input data subsets 211). In one embodiment, all of the subset-sorts, except for the last subset-sort, are overlapped with the read of the data for the subsequent subset 210. Thus, the subset-sort for each current subset is performed while the subsequent subset is being filled. In one embodiment, each of the subset-sorts is performed using a quick-sort algorithm.

After the last subset 210(X) is closed, its data is subset-sorted, and then a merge-sort is performed on all of the sorted input data subsets 211 to produce a sorted dataset 212 in total sorted order. The time for performing this last subset-sort is not overlapped with I/O in one embodiment, but the amount of data in the last subset 210(X) is only a small fraction of the entire data set 202, so the subset-sort can be performed relatively quickly. The merge-sort incrementally generates (completely) sorted data from the (partially) sorted input data subsets 211. The merge-sort according to one embodiment involves repeatedly picking the smallest data element from the entire set of sorted input data subsets 211. In one embodiment, the sorted dataset 212 is divided into a plurality of sorted output data subsets 214(1)-214(Y), where Y is an integer greater than one. In one embodiment, the total number, X, of input data subsets 210 equals the total number, Y, of sorted output data subsets 214, and the input data subsets 210 have the same size (e.g., same number of data elements) as the sorted output data subsets 214. In other embodiments, the number and size of the input data subsets 210 may vary from that of the sorted output data subsets 214. In one embodiment, sorting device 208 adjusts the size of the input data subsets 210 and/or the sorted output data subsets 214 based on the size of the data set 202 (e.g., making these elements to be, for example, $1/100^{th}$ or $1/1000^{th}$ of the total size of the data set 202, so that these elements will be larger (i.e., contain a greater number of data elements) for a larger data set 202, and will be smaller (i.e., contain a smaller number of data elements) for a smaller data set 202.

In one embodiment, the input data subsets 210 have a uniform size, and in another embodiment have a non-uniform size. In one embodiment, the sorted output data subsets 214 have a uniform size, and in another embodiment have a non-uniform size. In one embodiment, sorting device 208 is configured to dynamically size the input data subsets 210 and the sorted output data subsets 214 during the sorting process.

After the first sorted output data subset 214(1) has been generated (e.g., after the first $1/100^{th}$ or $1/1000^{th}$ of the data in the sorted input data subsets 211 has been merge-sorted), the output or writing phase begins. In one embodiment, each subsequent portion of the merge-sort is done in the background while the results of the previous merge-sort are being output (e.g., written to disk or output to a network). Thus, sorted output data subset 214(1) is output from sorting device 208 while sorted output data subset 214(2) is being generated by sorting device 208, and sorted output data subset 214(2) is output from sorting device 208 while the next sorted output data subset 214 is being generated by sorting device 208, and this process continues until the last sorted output data subset 214(Y) is output by sorting device 208. In one embodiment, the sorted data that is being generated for each current output data subset 214 is stored in a memory cache as it is generated, and is output from the memory cache while the next output data subset 214 is being generated.

In this way, by splitting the data into X shards or subsets 210, the only CPU time that is not overlapped with I/O is the time involved in subset-sorting 1/Xth of the data, followed by the time to merge-sort 1/Xth of the data. This makes virtually all of the CPU time for sorting disappear into the I/O time, even in systems where the I/O time is not much more than the compute time. For example, for subsets 210 that are each $\frac{1}{100}^{th}$ of the total size of the input dataset 202, the only CPU time that is not overlapped with an I/O operation is the time for subset-sorting $\frac{1}{100}^{th}$ of the total data plus the time to merge-sort $\frac{1}{100}^{th}$ of the data.

Figure 3:
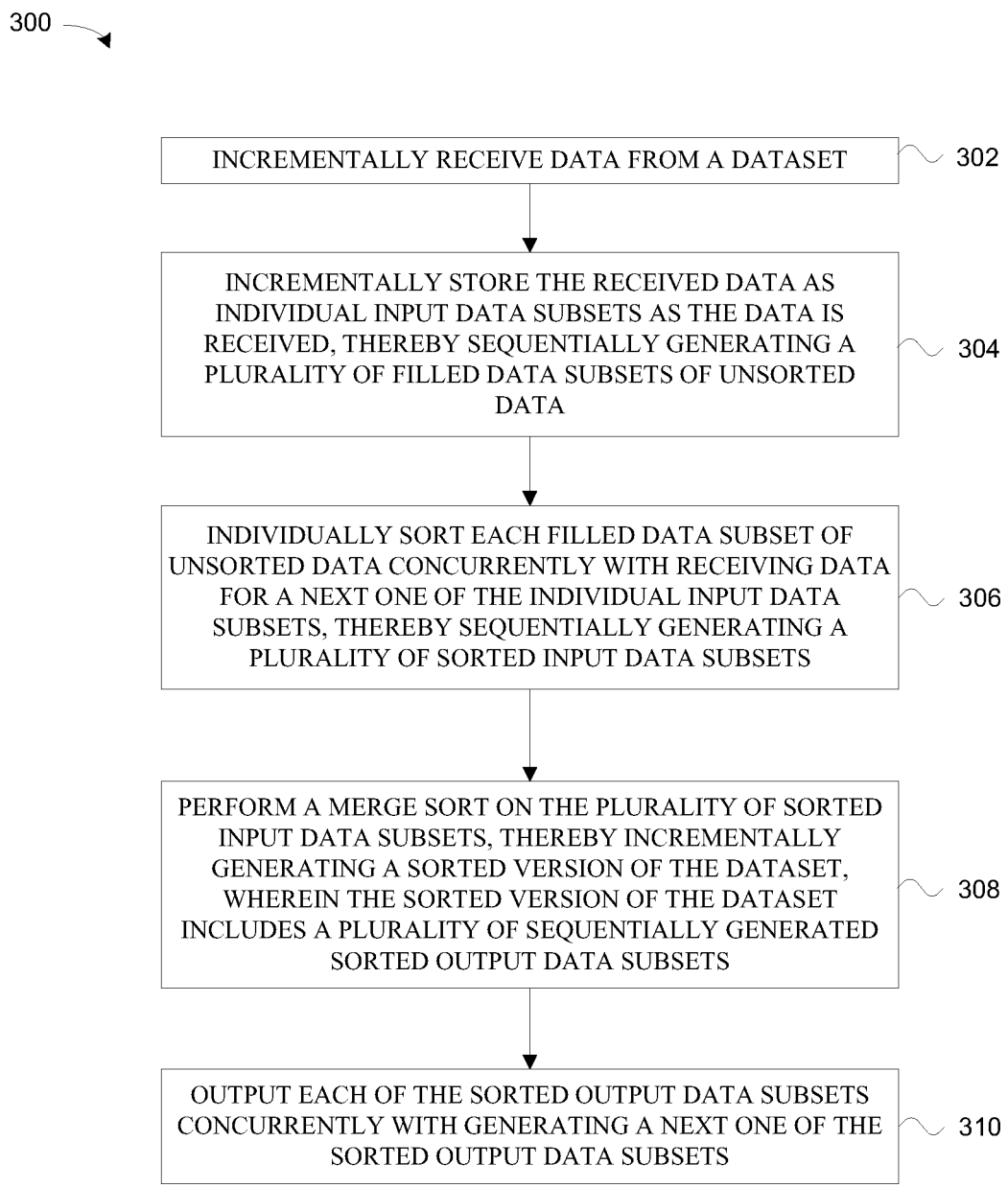
FIG. 3 is a flow diagram illustrating a method of sorting a dataset according to one embodiment.

FIG. 3 is a flow diagram illustrating a method 300 of sorting a dataset according to one embodiment. In one embodiment, sorting device 208 (FIG. 2) is configured to perform method 300. At 302 in method 300, data from a dataset is incrementally received. At 304, the received data is incrementally stored as individual input data subsets as the data is received, thereby sequentially generating a plurality of filled data subsets of unsorted data. At 306, each filled data subset of unsorted data is individually sorted concurrently with receiving data for a next one of the individual input data subsets, thereby sequentially generating a plurality of sorted input data subsets. At 308, a merge sort is performed on the plurality of sorted input data subsets, thereby incrementally generating a sorted version of the dataset, wherein the sorted version of the dataset includes a plurality of sequentially generated sorted output data subsets. At 310, each of the sorted output data subsets is output concurrently with generating a next one of the sorted output data subsets.

In one embodiment, the sorted output data subsets in method 300 each have a same size as the individual input data subsets. The outputting each of the sorted output data subsets in method 300 according to one embodiment comprises outputting each of the sorted output data subsets to a storage medium. In another embodiment, the outputting each of the sorted output data subsets comprises outputting each of the sorted output data subsets to a network file system. In one embodiment, a size of the individual input data subsets in method 300 is varied based on a size of the dataset. The individual input data subsets according to one embodiment each have a size that is a predetermined fraction of a size of the dataset. In one embodiment of method 300, the dataset is stored as a plurality of portions on a plurality of computing devices, and the data from the dataset is incrementally received from the plurality of computing devices. The individually sorting each filled data subset of unsorted data in method 300 according to one embodiment is performed using a quick-sort algorithm. In one embodiment, the data incrementally received from the dataset is received from a storage medium, and in another embodiment the data is received from a network file system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of sorting a dataset, comprising:
    incrementally receiving data from the dataset;
    incrementally storing the received data as individual input data subsets as the data is received, thereby sequentially generating a plurality of filled data subsets of unsorted data;
    individually sorting each filled data subset of unsorted data concurrently with receiving data for a next one of the individual input data subsets, thereby sequentially generating a plurality of sorted input data subsets;
    performing a merge sort on the plurality of sorted input data subsets, thereby incrementally generating a sorted version of the dataset, wherein the sorted version of the dataset includes a plurality of sequentially generated sorted output data subsets;
    varying a size of the individual input data subsets based on a size of the dataset; and
    outputting each of the sorted output data subsets concurrently with generating a next one of the sorted output data subsets.

2. The method of claim 1, wherein the sorted output data subsets each have a same size as the individual input data subsets.

3. The method of claim 1, wherein the outputting each of the sorted output data subsets comprises outputting each of the sorted output data subsets to a storage medium.

4. The method of claim 1, wherein the outputting each of the sorted output data subsets comprises outputting each of the sorted output data subsets to a network file system.

5. The method of claim 1, wherein the individual input data subsets each have a size that is a predetermined fraction of a size of the dataset.

6. The method of claim 1, wherein the dataset is stored as a plurality of portions on a plurality of computing devices, and wherein the data from the dataset is incrementally received from the plurality of computing devices.

7. The method of claim 1, wherein the individually sorting each filled data subset of unsorted data is performed using a quick-sort algorithm.

8. The method of claim 1, wherein the data incrementally received from the dataset is received from a storage medium.

9. The method of claim 1, wherein the data incrementally received from the dataset is received from a network file system.

10. A computer-readable storage medium storing computer-executable instructions that when executed by at least one processor cause the at least one processor to perform a method of sorting a dataset, the method comprising:
    incrementally receiving data from the dataset;
    sequentially generating a plurality of filled data subsets by incrementally storing the received data as individual input data subsets as the data is received;
    sequentially generating a plurality of sorted input data subsets by individually sorting each filled data subsets concurrently with receiving data for a next one of the individual data subsets;
    incrementally generating a sorted version of the dataset by performing a merge sort on the plurality of sorted input data subsets, wherein the sorted version of the dataset includes a plurality of sequentially generated sorted output data subsets; and
    outputting each of the sorted output data subsets concurrently with generating a next one of the sorted output data subsets.

11. The computer-readable storage medium of claim 10, wherein the sorted output data subsets each have a same size as the individual input data subsets.

12. The computer-readable storage medium of claim 10, wherein the method further comprises:
    varying a size of the individual input data subsets based on a size of the dataset.

13. The computer-readable storage medium of claim 10, wherein the individual input data subsets each have a size that is a predetermined fraction of a size of the dataset.

14. The computer-readable storage medium of claim 10, wherein the dataset is stored as a plurality of portions on a plurality of computing devices, and wherein the data from the dataset is incrementally received from the plurality of computing devices.

15. The computer-readable storage medium of claim 10, wherein the individually sorting each filled data subsets is performed using a quick-sort algorithm.

16. The computer-readable storage medium of claim 10, wherein the filled data subsets have a non-uniform size.

17. A method of sorting a dataset, comprising:
   incrementally receiving data from the dataset;
   sequentially generating a plurality of filled data subsets by incrementally storing the received data as individual input data subsets as the data is received;
   sequentially generating a plurality of sorted input data subsets by individually sorting each filled data subset concurrently with receiving data for a subsequent one of the individual input data subsets;
   incrementally generating a sorted version of the dataset by performing a merge sort on the plurality of sorted input data subsets, wherein the sorted version of the dataset includes a plurality of sequentially generated sorted output data subsets; and
   outputting each of the sorted output data subsets concurrently with generating a subsequent one of the sorted output data subsets.

* * * * *